United States Patent [19]

Oka et al.

[11] Patent Number: 4,473,139
[45] Date of Patent: Sep. 25, 1984

[54] DUSTCOVER FOR A DISC BRAKE

[75] Inventors: Hiroyuki Oka, Toyota; Hiroshi Uemura, Okazaki, both of Japan

[73] Assignee: Toyota Jidosha Kogyo Kabushiki Kaisha, Aichi, Japan

[21] Appl. No.: 574,635

[22] Filed: Jan. 27, 1984

Related U.S. Application Data

[63] Continuation of Ser. No. 251,787, Apr. 7, 1981, abandoned.

[30] Foreign Application Priority Data

Nov. 29, 1980 [JP] Japan .......................... 55-171748[U]

[51] Int. Cl.³ .............................................. F16D 65/84
[52] U.S. Cl. ............................ 188/71.6; 188/218 A; 188/264 AA; 192/113 A; 301/6 CS
[58] Field of Search ................... 188/218 A, 264 A, , 188/264 AA, 71.6; 192/113 A; 301/6 CS, 6 CF

[56] References Cited

U.S. PATENT DOCUMENTS

| | | | |
|---|---|---|---|
| 2,655,236 | 10/1953 | Bachman | 188/71.6 X |
| 4,005,768 | 2/1977 | Bubrash et al. | 188/218 A |
| 4,250,979 | 2/1981 | Kawaguchi | 188/264 A X |
| 4,317,508 | 3/1982 | Kafagiri et al. | 188/71.6 X |

FOREIGN PATENT DOCUMENTS

| | | | |
|---|---|---|---|
| 795548 | 1/1936 | France | 301/6 CS |
| 55-142132 | 11/1980 | Japan | 188/218 A |
| 677248 | 8/1952 | United Kingdom | 188/264 AA |

*Primary Examiner*—George E. A. Halvosa
*Attorney, Agent, or Firm*—Parkhurst & Oliff

[57] ABSTRACT

A dustcover used in a disc brake of a vehicle for covering a disc rotor disposed in a wheel disc of cup shape from the opposite side of the wheel disc so as to protect the rotor from splashed mud water. The dustcover is provided with a pair of vent openings respectively open to the frontward direction and the rearward direction of the vehicle formed thereon at a lowered portion thereof than the rotational axis of the rotor. An air collecting portion is formed at the frontwardly open vent opening, gradually expanding in the air flowing area in the frontward direction of the vehicle. The front end of the air collecting portion is projected out of the cup-shaped wheel disc. The air collected by the air collecting portion is allowed to pass rearwardly through the dustcover right along the lower half portion of the rotor for cooling it.

10 Claims, 5 Drawing Figures

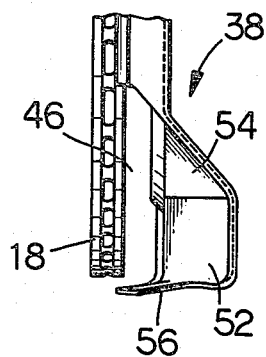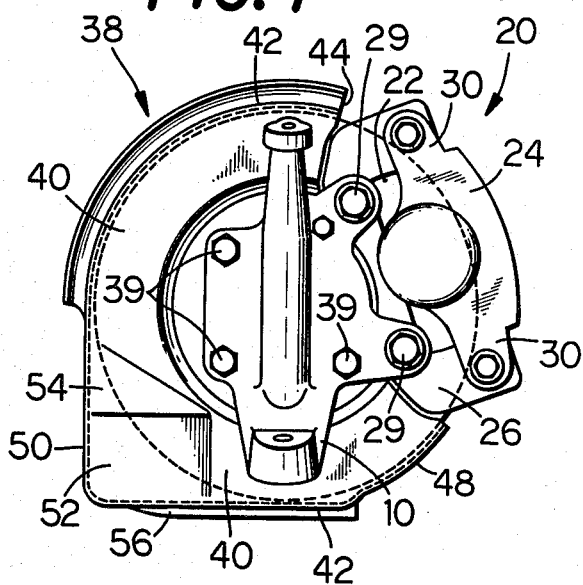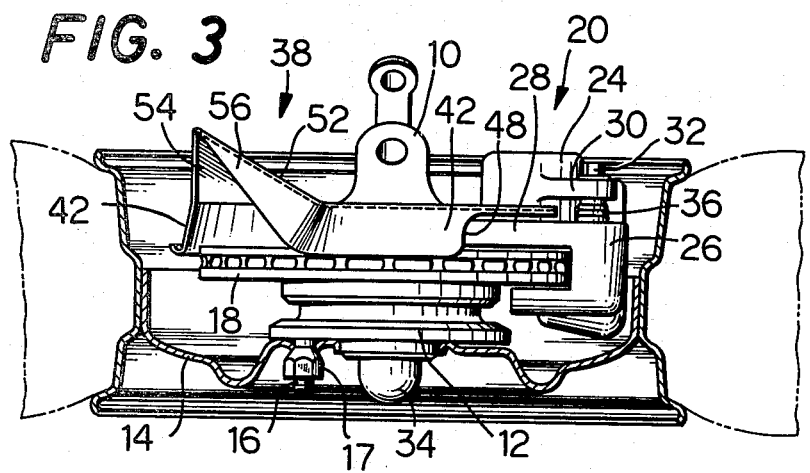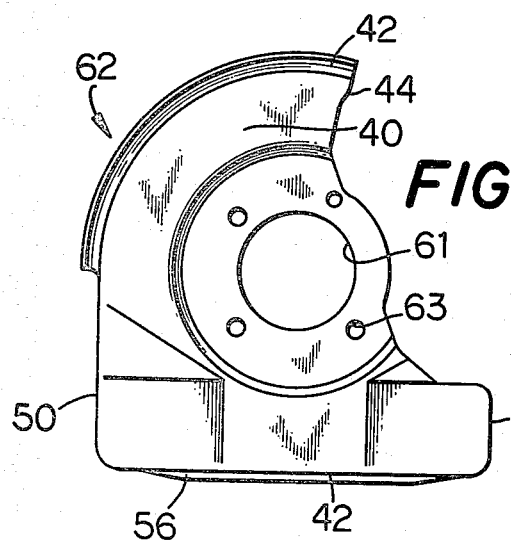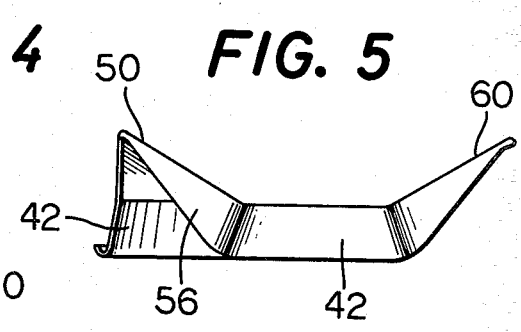

4,473,139

DUSTCOVER FOR A DISC BRAKE

This is a continuation of application Ser. No. 251,787 filed Apr. 7, 1981, now abandoned.

BACKGROUND OF THE INVENTION

This invention relates to a dustcover for a disc brake of a vehicle. The dustcover for a disc brake is primarily designed to protect the disc rotor, disposed in a wheel disc of cup shape, from muddy water being attached thereto by means of covering the same from the opposite side of the wheel disc, and thereby restraining occurrence of the so-called water fade phenomenon as well as deterioration and quick wear of the friction surface of the rotor and brake pads placed on either side thereof so as to sandwich the rotor. The dustcover is therefore so constructed as to cover the rotor for the purpose of achieving the primary object thereof, i.e., the covering or protecting of the rotor, ranging over almost the whole circumferential sphere except only a part where the caliper assembly as the braking mechanism is located.

Perfect or next-to-perfect covering of the rotor by the dustcover is liable to however cause less cooling of the rotor followed by possible overheating, which often results in the fading phenomenon and sometimes vapor-lock, that is, a braking incapability due to gasification of the brake fluid caused by the overheating.

OBJECTS AND SUMMARY OF THE INVENTION

This invention was made from such a background. The primary object thereof is to provide a dustcover having the function of cooling the rotor while maintaining the protecting capability for the rotor from muddy water to the highest possible extent.

Another object of this invention is to provide a dustcover which is able to achieve the above-mentioned object at the least possible rising of the manufacturing cost.

A dustcover for a disc brake in accordance with this invention, which protects the disc rotor disposed in a wheel disc of a cup shape of a vehicle from muddy water by means of covering the same from opposite side of the wheel disc, is provided with at a portion thereof lower than the rotational axis of the rotor two vent openings open frontwards and rearwards respectively, and an air collecting portion, having a gradually expanding air flowing area along the frontward direction of the vehicle, disposed at least at the front side vent opening, whereby the air or wind collected by the air collecting portion is allowed to flow rearwardly through the dustcover along the lower portion of the rotor.

By virtue of such a structure occurrence of the water fade phenomenon, deterioration of the friction surfaces and/or rapid wear of the rotor and brake pads due to attaching of muddy water or the like to the rotor can be effectively prevented, and also the overheating of the rotor can be remarkably diminished with an advantage of favorably restraining the fade and vapor-lock.

BRIEF DESCRIPTION OF THE DRAWING

FIG. 1 is an elevational view of a disc brake wherein an embodiment of the dustcover of this invention is incorporated;

FIG. 2 is a profile of a part of the dustcover showing particularly the surroundings of an air collecting portion;

FIG. 3 is a bottom plan view of the disc brake shown in FIG. 1, with a part shown in section;

FIG. 4 is an elevational view of another embodiment of the dustcover of this invention; and FIG. 5 is a bottom plan view of the dustcover shown in FIG. 4.

DETAILED DESCRIPTION OF THE PREFERRED EMBODIMENTS

With reference to the appended drawing several preferred embodiments of this invention will be described hereafter.

By means of a knuckle 10 shown in FIG. 3, a non-rotatable member, a hub 12 is rotatably retained by way of a not-shown shaft secured thereto and a not-shown bearing fitted on the shaft. On the hub 12 a wheel disc 14 is secured, with a bolt 16 and a nut 17, in a posture to accommodate the same. And a disc rotor 18 is secured to the hub 12 on the opposite side of the wheel disc 14. Over a part of the rotor 18, a caliper assembly 20 for restraining the rotation thereof is disposed as shown in FIG. 1, the caliper assembly being in a straddling status, at an upper part of the rotor 18 slantingly a little to the rear side of the vehicle. As shown in FIG. 3, the wheel disc 14 is fixed to a wheel rim which cooperates with the wheel disk 14 to define a space in which the disc rotor 18 and the caliper assembly 20 are accommodated. The caliper assembly 20 consists of a pair of brake pads 22 disposed on both side of the rotor 18, a caliper 24 for urging the brake pads 22 onto the rotor 18, and a mounting bracket 26 for movably retaining the pads 22 and the caliper 24. The bracket 26 is as shown in FIG. 3 of saddle shape for being secured at a base plate portion 28 thereof to the knuckle 10 with a bolt 29. The caliper 24 is retained while fitting into fitting bores formed in a pair of caliper arms 30 by respective slide pins 32 erected on the bracket 26.

Numeral 34 designates a cap for covering the end of the shaft, and 36 designates a dustboot for covering the slide pin 30.

A dustcover 38 made of a steel plate is secured with a bolt 39 on the knuckle 10 so as to cover the rotor 18 from the opposite side of the wheel disc 14, for protecting it from attachment of muddy water or the like thereto. The dustcover 38 is in its elevational view of a partly-devoid circular form substantially identical to that of the rotor 18, and consists of a flat plate portion 40 parallel to the friction surface of the rotor 18 and a peripheral wall portion 42 extended by being bent from the skirt of the flat plate portion 40 toward the rotor 18, thereby forming as a whole a shallow cup shape. The partly devoid portion for accommodating the caliper assembly 20 at a slightly rearwardly slanted upper portion of the rotor 18 is illustrated as a cut away portion 44 in FIG. 1. The peripheral wall portion 42 is, at the portion lower thereof than the axial line of rotor 18, partly removed on the front and rear side thereof in respect of the vehicle for forming vent openings 46, 48 open towards the front side and the rear sides respectively. Those openings 46, 48 allow cool air or wind to flow therethrough along the lower half of the rotor 18 in the reverse of the vehicle driving direction. The vent opening 46 on the front side, out of the two openings 46, 48, is provided with an air collecting or gathering portion 50 projected from the flat plate portion 40 for introducing as much cooling air as possible inside the dustcover. The air collecting portion 50 is formed as an extension from the flat plate portion 40 with a shape of substantially right-angled triangle in elevation as illustrated in FIG. 1, where it is defined with a tangential line vertically extending along the front end of the rotor 18 and a tangential line horizontally extending along the lower end of the rotor 18. This air collecting portion 50 is open substantially within the previously indicated space defined by the inner surface of the wheel disc 14 and the wheel rim, and therefore concurrently functions as a shelter for protecting the rotor 18 from muddy water splashed near the vent opening 26. Thus, this shelter cooperates with the wheel disc and rim assembly to provide a shielding device for the disc rotor.

The above-mentioned air-collecting portion 50 consists of (1) a vertical wall portion 52, being of rectangular in elevation with a vertical surface extending, from the portion connecting with the flat plate portion 40 toward the front of the vehicle in such a manner that the distance from the surface of the rotor 18 is gradually increased, until the front edge thereof falls outside the inner end of the wheel disc 14, i.e., the front edge projects beyond the inner end of the wheel disc 14 to the nearer side to the longitudinal center line of the vehicle, (2) a slant wall portion 54 of triangular shape extending away from the surface of the rotor 18 along the frontward and downward direction so as to connect the upper edge of the vertical wall portion 52 with the flat plate portion 40, and (3) a lower wall portion 56 extending from the lower edge of the vertical wall portion 52 toward the rotor 18, being continued to the peripheral wall portion 42. In other words, the air collecting portion 50 gradually expands, i.e., departs away from the rotor 18, along the frontward direction so as to expand the area of the air inlet, and projects at its front edge out of the wheel disc 14 to thereby take more cooling air into the dustcover 38. The front edge of the air collecting portion 50, i.e., the brim of the opening, is reinforced in its rigidity by forming a rib there by means of inwardly bending the edge thereof toward the rotor 18. And the lower wall portion 56 functions well in preventing muddy water or the like from being splashed from beneath the dustcover 38.

The air collecting portion 50 is formed quite favorably by being preserved, when a steel plate is press punched in the dustcover manufacturing course, not to be cut off as in ordinary cases. Formation of the air collecting portion 50 made by a simple pressing process and will not increase the manufacturing cost in any sense, nor require a larger steel plate than usual.

Assume a case wherein a vehicle having a disc brake provided with a dustcover 38 of such structure is driven on a road full of pools of water, muddy places, or laid snow. The brake will not be affected by splashed muddy water or the like by the wheel on the opposite side across the vehicle body, because the water coming therefrom which otherwise might cause the earlier mentioned evils can be protected by the knuckle-sided surface of the flat plate portion 40 of the dustcover 38 from reaching the rotor 18. Water which is splashed a little forwardly and falls on the brake from front side due to the advancing of the vehicle, will be protected by the peripheral wall portion 42 from reaching the rotor 18. At the portions of the vent opening 48 and of the cut away portion 44 for accommodating the caliper assembly 20 where the peripheral wall portion is respectively devoid ingress of the water is almost perfectly prevented because of their rearwardly located positioning. As to the vent opening 46 on the front side, the air collecting portion 50 extending from the flat plate portion 40 guards the inside of the dustcover 38.

The braking function in the above-mentioned disc brake is effectuated by the urging together of the pads 22 on either side of the rotor 18 rotating together with the wheel by the caliper 24. The rotor 18 is liable to be damaged by the overheating which happens as frictional heat owing to the repeated braking operation.

In the above described disc brake the rotor 18 can be protected from possible overheating or evils owing thereto, because the design of the air collecting portion 50 functions to collect sufficient cooling air which is directed from the vent opening 46 to the vent opening 48, passing through the dustcover 38 right along the lower half surface of the rotor 18 while satisfactorily cooling the same, with a result of effective prevention of the overheating.

The air in the neighborhood of the vehicle is moving in reverse to the driving direction thereof, i.e., rearwardly in relation to the vehicle, and the air stream is larger in quantity at the lower portion of the wheel than the rotational axis according to an ascertained experiment. This means that the air flows in larger quantity along the lower half of the rotor 18 than the upper half thereof. Since the air collecting portion 50 and the vent openings 46, 48 are all formed corresponding to the lower half of the rotor 18, ample cooling air is favorably directed through the inside of the dustcover 38.

Another embodiment of this invention is shown in FIGS. 4 and 5, wherein a swollen portion 60 or an air discharging portion is formed as a continuation of the vent opening 48, just in a symmetrical shape and position to the air collecting portion 50 in the previous embodiment. This air discharging portion 60 partly interferes with the cut away portion 44 for attachment of the caliper assembly 20, and is consequently obliged to be partly cut off. Numerals 61, 63 in FIG. 4 designate respectively a shaft pierced bore and a bolt hole. Structure of other portions are all identical to that in the previous embodiment.

This embodiment provided with the air discharging portion 60, in addition to the air collecting portion 50, results in much better air flow within the dustcover 62 because of the improved air discharging in the air discharging portion 60. Besides, this embodiment results in introduction of the cooling air even in the backward directional driving of the vehicle and improved prevention of the water ingress at the vent opening portion 48.

The air collecting portion or air discharging portion in the previous embodiments are all, at the front edge or the rear edge thereof, defined by a vertical tangential line of the rotor and a horizontal tangential line of the rotor, but either of them may be further extended beyond the defined front edge line or rear edge line. It will improve the water protecting capability of the air collecting or discharging portion.

The air collecting portion or air discharging portion may be, unlike in the previous embodiments wherein it is integrally formed with the dustcover main body, separately formed from the main body for being attached thereto later.

What is claimed is:

1. A dustcover used in a disc brake of a vehicle having a disc rotor which is disposed in a wheel disc-rim assembly of cup shape comprising a wheel disc and a wheel rim fixed to said wheel disc, said dustcover covering said disc rotor on a side opposite to said wheel disc so as to protect said rotor from foreign matter, said dustcover comprising:
- a generally circular flat plate portion extending substantially parallel to the surface of said disc rotor;
- portions defining first and second air vent openings which are open frontwardly and rearwardly of the vehicle respectively and which are located at positions completely lower than the rotational axis of said rotor; and
- an air collecting portion disposed at least at said first vent opening and substantially entirely accommodated within a space defined by the inner surface of said wheel disc-rim assembly such that said air collecting portion is open substantially within said space, said air collecting portion including an extension projecting radially outwardly from an outer peripheral edge of said generally circular flat plate portion, said air collecting portion having a cross sectional area gradually expanding in the frontward direction of the vehicle, external edges in elevation of said extension being substantially defined by a vertical line tangent to the periphery of the rotor at its front end and a horizontal line tangent to said periphery of the rotor at its lower end, the inner surface of a lower portion of said dustcover and the opposite surface of a lower portion of said rotor defining an air flow space through which a stream of air collected by and admitted into said air collecting portion during a frontward driving of the vehicle passes rearwardly in a direction along a line tangent to the periphery of said disc rotor at its lowermost point, said extension blocking said foreign matter which comes toward an outer surface of said circular flat plate portion and which would otherwise enter into said air collecting portion.

2. A dustcover as set forth in claim 1, further comprising a cut-away portion to define an open space for accommodating a caliper assembly for restraining the rotation of said rotor, said cut-away portion being located at a rear upper position of said dustcover relative to said rotational axis.

3. A dustcover as set forth in claim 1, wherein at least the front end of said air collecting portion is projected out of said wheel disc-rim assembly axially of said rotor.

4. A dustcover as set forth in claim 1, wherein said second vent opening comprises an air discharging portion whose air flowing area gradually expands in the rearward direction of the vehicle.

5. A dustcover as set forth in claim 1, wherein said air collecting portion consists of (1) a vertical wall portion rectangular in elevation having a vertical surface extending, from a portion connecting the vertical wall portion with the flat plate portion in the frontward direction of the vehicle in such a manner that the distance from the surface of the rotor is gradually increased, until the front edge thereof falls outside the axially inner end of the wheel disc-rim assembly, (2) a slant wall portion of triangular shape extending away from the surface of the rotor in the frontward and downward directions so as to connect the upper edge of the vertical wall portion with the flat plate portion, and (3) a lower wall portion extending from the lower edge of said vertical wall portion toward the rotor and terminating in said peripheral wall portion in a direction substantially perpendicular to the extending direction of said lower wall portion.

6. A dustcover as set forth in claim 1, wherein a front edge of said air collecting portion extends toward the disc rotor to create a rib for improving the rigidity of said air collecting portion.

7. A dustcover used in a disc brake of a vehicle having a disc rotor which is disposed in a wheel disc-rim assembly of cup shape comprising a wheel disc and a wheel rim fixed to said wheel disc, said dustcover covering said disc rotor on a side opposite to said wheel disc to protect said rotor from foreign matter entering through air collecting vents, said dustcover comprising:
- a generally circular flat plate portion extending substantially parallel to the surface of said disc rotor;
- portions defining first and second air vent openings opening frontwardly and rearwardly of the vehicle respectively and located at front and rear positions completely lower than the rotational axis of said rotor and relative to said rotational axis;
- a peripheral wall portion extending from said outer peripheral edge of said flat plate portion toward said rotor such that said dustcover as a whole is of a shallow cup shape, said dustcover being devoid of said peripheral wall portion at said front and rear positions so as to comprise said first and second vent openings; and
- an air collecting portion disposed at least at said first vent opening and substantially entirely accommodated within a space defined by the inner surface of said wheel disc-rim assembly such that said air collecting portion is open substantially within said space, said air collecting portion including an extension projecting radially outwardly from an outer peripheral edge of said generally circular flat plate portion and connected to said peripheral wall portion, said air collecting portion having a cross-sectional area gradually expanding in the frontward direction of the vehicle, external edges in elevation of said extension being substantially defined by a vertical line tangent to the periphery of the rotor at its front end and a horizontal line tangent to said periphery of the rotor at its lower end, the inner surface of a lower portion of said dustcover and the opposite surface of a lower portion of said rotor defining an air flow space through which a stream of air collected by and admitted into said air collecting portion during a frontward driving of the vehicle passes rearwardly in a direction along a line tangent to said periphery of said disc rotor at its lowermost point, said extension blocking foreign matter which comes toward an outer surface of said circular flat plate portion and which could otherwise enter into said air collecting portion.

8. A dustcover as set forth in claim 7, wherein said air collecting portion includes a lower wall portion extending from the lower edge of said extension toward said rotor and terminating in said peripheral wall portion in a direction substantially perpendicular to the extending direction of said lower wall portion.

9. A dustcover as set forth in claim 7, wherein said air collecting portion and said flat plate portion are formed of a single steel plate.

10. A dustcover as set forth in claim 7, wherein said air collecting portion and said flat plate portion are separate parts fixed to each other.

* * * * *